Feb. 3, 1970  R. S. LUNDIN  3,493,790
ELECTRONIC TIMER CIRCUITS WITH CONSTANT CURRENT SOURCE
Filed Oct. 31, 1966  2 Sheets-Sheet 1
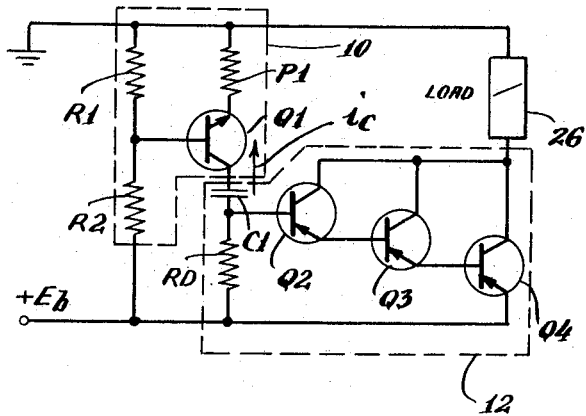
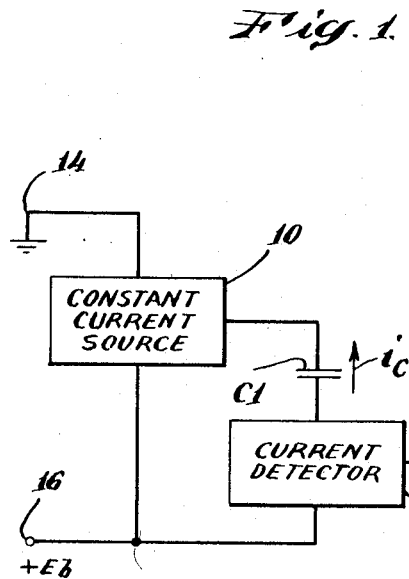
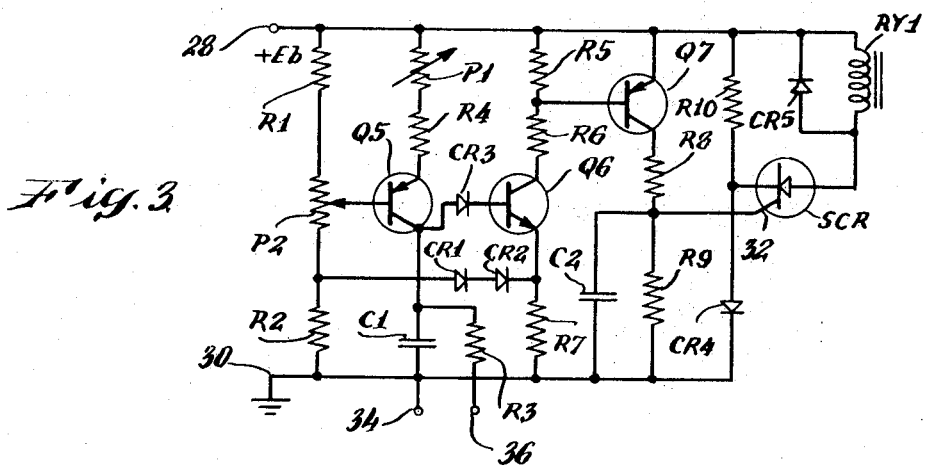
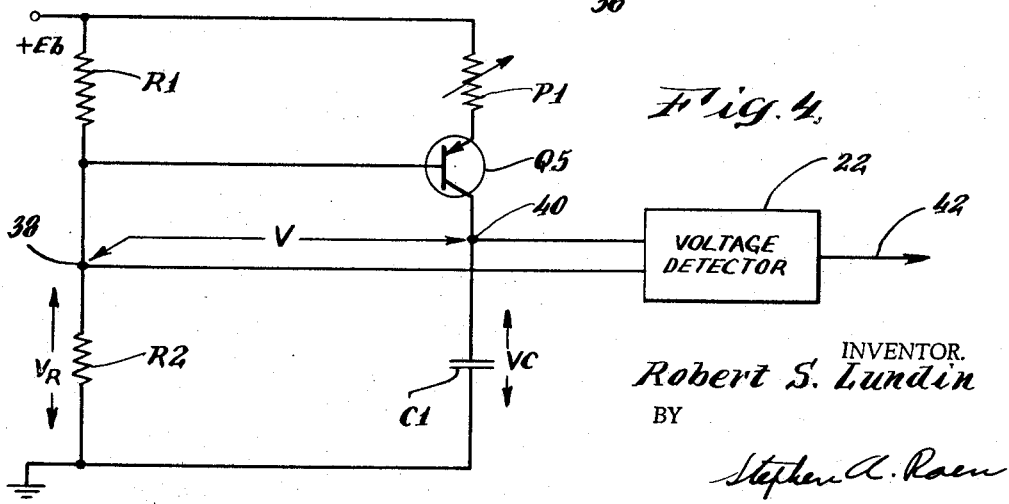
INVENTOR.
Robert S. Lundin
BY
Stephen A. Roen
ATTORNEY.

INVENTOR.
Robert S. Lundin
BY
Stephen A. Roen
ATTORNEY.

United States Patent Office 3,493,790
Patented Feb. 3, 1970

3,493,790
ELECTRONIC TIMER CIRCUITS WITH
CONSTANT CURRENT SOURCE
Robert S. Lundin, Thomaston, Conn., assignor to General
Time Corporation, Stamford, Conn., a corporation of
Delaware
Filed Oct. 31, 1966, Ser. No. 590,707
Int. Cl. H03k 17/26
U.S. Cl. 307—293                                5 Claims

ABSTRACT OF THE DISCLOSURE

An electronic timer circuit in which a capacitor is initially charged from a constant current source in a linear rather than an exponential fashion. As the capacitor becomes fully charged, the current therethrough decreases below the initial constant value, this decrease being detected by a low leakage current detector to signal the end of a timed interval. In an alternate embodiment the charged state of the capacitor is detected by a voltage detector, the energization of which triggers a relay output circuit to signal the end of the timed interval.

This application is closely related to the co-pending applications of Klaus Wallentowitz, Ser. No. 405,503, now U.S. Patent No. 3,355,632, filed Oct. 21, 1964; Ser. No. 589,336, filed Oct. 25, 1966, concurrently with my said application, both entitled "Electronic Timer Circuit"; and Ser. No. 591,016, filed Oct. 31, 1966, entitled "Electronic Timer Circuits." The above-identified applications are assigned to the same assignee as the present invention and are incorporated herein by reference.

The present application discloses a method of extending the timing period of a capacitor having a given capacitance by charging the capacitor from a constant current source. The application also discloses the use of a current detector for detecting when a given charge has been applied to a capacitor. The combination of constant current charging and current detection is particularly efficacious in electronic timer circuits.

There is also disclosed herein an electronic timer circuit employing a constant current source for charging a timing capacitor and a voltage detector, said voltage detector being of the type disclosed in the above-identified Wallentowitz application, Ser. No. 405,503. This combination provides a general purpose timer circuit at low cost. The relay load of this circuit is controlled by a silicon-controlled rectifier. A capacitor and resistor are connected in parallel between the trigger and the base of the silicon-controlled rectifier in accordance with the above-identified Wallentowitz applications Ser. No. 589,336 and Ser. No. 591,016 for the purpose of noise suppression. Additionally, as disclosed in said Wallentowitz applications, a diode is connected in the base circuit of said SCR for the purpose of suppressing transient pulses to the SCR trigger.

Many electronic timers have been devised according to the prior art for specific applications. Some of these are disclosed and discussed in the above-identified co-pending applications. If an electronic timer circuit is desired for a specific application, a circuit according to the prior art can be chosen to efficiently meet those requirements at the lowest possible cost. However, if the number of timers to be used in the specific application is small, oftentimes the cost of the engineering time required in designing a minimum cost circuit vastly exceeds the resulting circuit cost saving. On the other hand, a timer circuit can be designed according to the prior art which meets a wide variety of stringent specifications and can be employed in nearly all applications. However, these timer circuits are relatively expensive.

Desirable qualities in general purpose electronic timer circuits are timing accuracy, quick reset, little effect on accuracy when timing cycles are quickly repeated (repeat accuracy), consistant fulfillment of specifications, and low cost. A major element of cost in prior art timers are the timing capacitors employed. When the charging of the timing capacitor is effected according to prior art techniques, the range of the timer is relatively restricted in the order of about ten to one; that is, with a given capacitance value, a timer may have a range of from 1 to 10 seconds or 10 to 100 seconds or the like. Larger capacitors are required for the longer time ranges. The larger the capacitor employed, the larger its leakage current. This leakage current varies with temperature and, therefore, has an adverse effect on timer accuracy. Thus, according to prior art, electronic timers measuring relatively long time intervals are less accurate than electronic timers measuring relatively shorter time intervals.

Furthermore, large capacitors in the circuit require larger discharge times and adversely affect repeat accuracy and reset time.

According to the prior art, a timing cycle is ended by detecting when the voltage across the timing capacitor equals or exceeds a predetermined value. Such voltage detectors must have high impedances in order to minimize the leakage currents therethrough. Furthermore, these impedances are temperature sensitive and their temperature changes cause changes in the leakage current through such detectors adversely affecting the accuracy of prior art timers.

Quite large capacitances must be used in long time interval timers, according to prior art, because these capacitors are charged from a constant voltage supply. The rate of change of the voltage across the capacitor is greatest when the capacitor is less than half-charged to its full capacity and becomes very small when the capacitor is nearly fully charged. Since it is this rate of change that determines the accuracy of prior art voltage detector circuits, relatively large capacitors are used, at least until the leakage current causes inaccuracies to become equal to, or slightly less than, the voltage detecting capabilities of the circuit.

Furthermore, long time period adjustable timers according to the prior art require high resistance potentiometers for use as variable resistors in series with their timing capacitors. Such potentiometers are manufactured with very poor control of their temperature coefficient tolerance. This adversely affects timing accuracy and makes the consistent fulfillment of specifications very expensive if not impossible.

It is, therefore, an object of the present invention to provide electronic timer circuits.

Another object of the invention is to provide electronic timer circuits having relatively broad application at low cost.

Still another object of the invention is to provide electronic timer circuits of the above character having increased timing accuracy.

Yet another object of the invention is to provide electronic timer circuits of the above character having quick reset characteristics.

Another object of the invention is to provide electronic timer circuits of the above character providing timer ranges from zero to fifteen minutes.

Still another object of the invention is to provide electronic timer circuits of the above character providing repeatability of plus or minus five percent.

Yet another object of the invention is to provide electronic timer circuits of the above character providing greatly increased adjustable timer ranges.

A further object of the invention is to provide electronic timer circuits of the above character employing capacitors as the timing elements.

A still further object of the invention is to provide electronic timer circuits of the above character having good repeat accuracy.

A yet further object of the invention is to provide electronic timer circuits of the above character providing an increased timer delay for a given value of timer capacitor.

Another object of the invention is to provide adjustable electronic timer circuits of the above character.

Yet another object of the invention is to provide electronic timer circuits of the above character having the quantities of low unit cost, ease of fulfillment of specifications and high reliability.

Other objects of the invention will in part be obvious and will in part appear hereinafter.

The invention accordingly comprises the features of construction, combinations of elements, and arrangements of parts which will be exemplified in the constructions hereinafter set forth, and the scope of the invention will be indicated in the claims.

For a fuller understanding of the nature and objects of the invention, reference should be had to the following detailed description taken in connection with the accompanying drawings, in which:

FIGURE 1 is a schematic electrical circuit diagram, partially in block form, of a preferred embodiment of my invention;

FIGURE 2 is a schematic electrical circuit diagram, partially in block form, of an electronic timer circuit constructed according to the principal features of my invention;

FIGURE 3 is a schematic electrical circuit diagram of a general purpose electronic timer circuit according to my invention;

FIGURE 4 is a schematic electrical circuit diagram, partially in block form, illustrating the principle of operation of the electronic timer circuit shown in FIGURE 3;

The same reference characters refer to the same elements throughout the several views of the drawings.

In the preferred embodiment of my invention, shown in FIGURE 2, a fixed capacitor C1 is connected in series with a constant current source 10, a current detector 12, and a source of fixed battery potential $+E_b$ supplied between ground terminal 14 and positive battery terminal 16.

Figure 6:
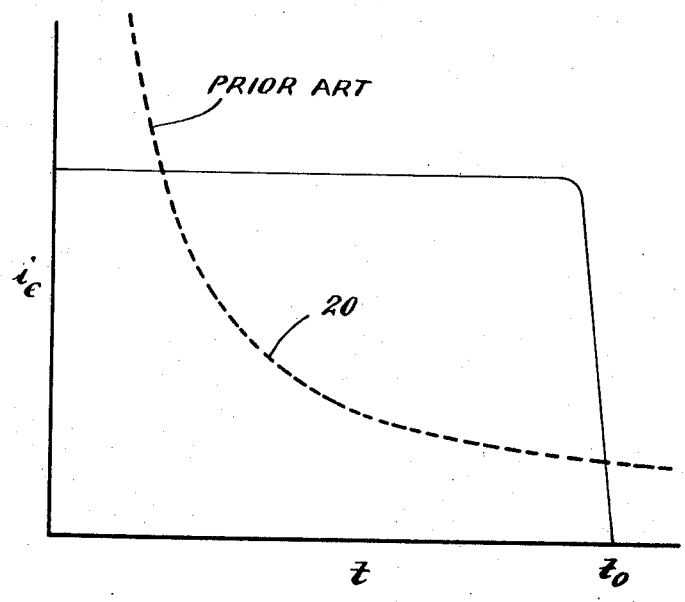
FIGURE 6 is a diagram of the charging current versus time characteristics of a timing capacitor when charged in accordance with the prior art and when charged in accordance with my invention; and, FIGURE 7 is a diagram of the charge voltage versus time characteristics of a timing capacitor when charged in accordance with the prior art and when charged in accordance with my invention.

Now referring to FIGURES 6 and 7, the princple of my constant current charging invention may be understood as follows. According to the prior art, a timing capacitor is charged through a resistor, the charging current $i_C$ initially being very large, decaying rapidly at first and then slowly until the capacitor is fully charged at time $t_0$, as indicated by the dotted curve. According to my invention, the charging current $i_C$ is at first held to a relatively low level and maintained at that level until the capacitor is nearly fully charged at which time the current rapidly falls off, providing a step function. This rapid fall-off in current may be detected by my current detector 12 of FIGURE 2 and it provides a signal on the signal line 18 indicating the end of the timing interval.

Figure 5:
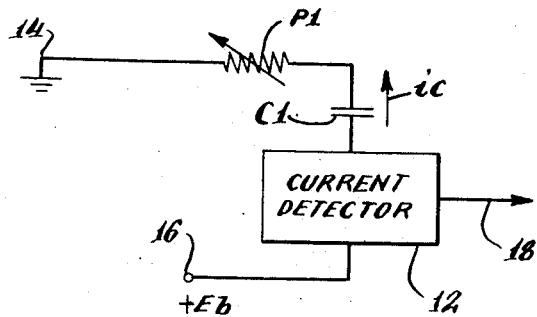
FIGURE 5 is a schematic electrical circuit diagram, partially in block form, of an electronic timer circuit constructed according to one aspect of my present invention.

The current detector 12 of my invention may be used in combination with prior art charging circuits as shown in FIGURE 5. There a variable resistor P1 is connected in series with timing capacitor C1, current detector 12, and a source of $+E_b$ potential connected between ground terminal 14 and positive terminal 16. In the circuit of FIGURE 5 the level of current detected by the current detector must be chosen to be within the rather steep region 20 of the prior art charging curve, shown in FIGURE 7, and, thus, a relatively larger capacitor must be used to achieve the same timing interval as when constant current charging is used.

The great advantage of my current detector 12 is that no elements are placed in circuit across the timing capacitor C1. Thus, there is no possibility of leakage currents through the detector varying with temperature, humidity and the like which reduce the timing accuracy of the timer.

Figure 7:
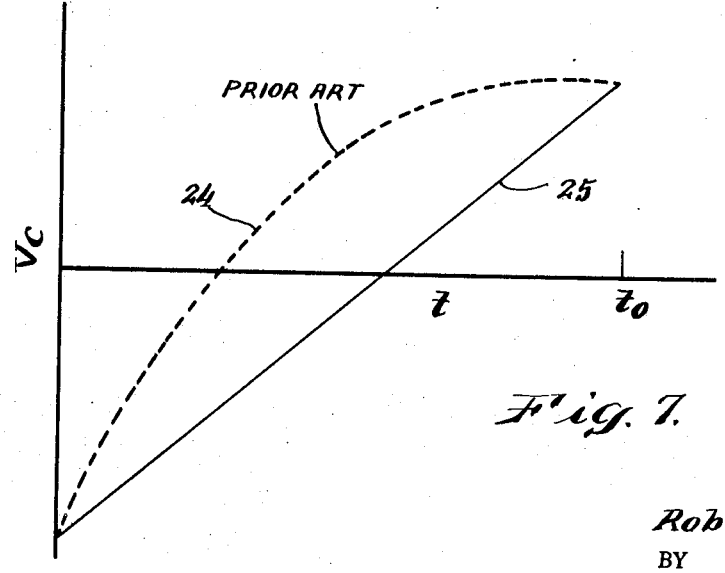

My constant current charging invention may be used in combination with a voltage detector 22, as shown in FIGURE 4, to extend the time interval provided by a capacitor having a given capacitance as best understood with reference to FIGURE 7. Therein the charge voltages $V_C$ across the capacitor, as it is being charged according to the prior art and as it is being charged according to my constant current charging invention, are shown. The prior art curve is the well known exponential decay curve wherein the voltage initially rises rapidly and then ever more slowly until the full charge is reached at time $t_0$. As described in the above-identified application of Klaus Wallentowitz, Ser. No. 405,503, good voltage detection is provided only at the relatively fast raising straight portion of the curve at 24. However, using my constant current charging invention, the voltage rise across the capacitor is linear as shown at 25. Voltage detection is of constant accuracy anywhere along this curve and may take place near the time $t_0$ when the capacitor is fully charged. Thus, timers using my constant current charging invention may be provided with timing ranges many times greater than those provided by the prior art.

When in the preferred embodiment of my invention my constant current source 10 and current detector 12 are used in combination, timers having large timing ranges for small capacitances are provided; detector leakage currents are avoided; and the end of a timing interval, is indicated by a step function in the charging current which is easily and accurately detected.

More particularly referring to FIGURE 1, transistor Q1 is used as a current regulator to provide my constant current source 10. Current detector 12 comprises a resistor $R_D$ in series with timing capacitor C1. A cascaded transistor amplifier comprising transistors Q2, Q3 and Q4, is connected across resistor $R_D$ to sense the change in voltage drop thereacross when the charging current ceases. The output of the current detector 12 controls a direct current load 26 which may be a relay.

The principle of operation of the circuit of FIGURE 1 is as follows:

(1) R1 and R2 form a voltage divider for the bias of Q1 in proportion to the line voltage $E_b$. The voltage across R1 is given by $$V_{R1} = \frac{R1 E_b}{R1 + R2}$$

$V_{R1}$ must be less than the junction drop across emitter to base of Q1 so that the junction drop does not become the limiting parameter. For silicon transistors this is about 0.6 volt.

(2) Current flowing through P1, the emitter collector junction of Q1, and through the capacitor C1 is limited by the regulation of Q1. Regulation is governed by the balance of $V_{P1}$ (the voltage across P1) and $V_{R1}$ expressed by the following equations:

$$V_{P1} = iP_1$$

and $$V_{R1} = \frac{R1 E_b}{R1 + R2}$$

Balance occurs when $V_{P1} = V_{R1}$. Therefore, $$iP_1 = \frac{R1 E_b}{R1 + R2}$$

and, $$i = \frac{R1 E_b}{P1(R1 + R2)}$$

(3) The voltage across capacitor C1 is given by:

$$V_C = \frac{1}{C} = \int i \, dt$$

Since $i$ is constant as per the above equation:

$$V_C = \frac{it}{C} = \frac{R1 E_b t}{P1 C (R1 + R2)}$$

(4) But $i$ suddenly drops to zero when $V_C = E_b$; therefore, this becomes the time constant of the system and is expressed:

$$E_b = V_C = \frac{R1 E_b t_0}{P1 C (R1 + R2)}$$

or solving for $t_0$, $$t_0 = \frac{E_b P1 C (R1 + R2)}{R1 E_b} = \frac{P1 C (R1 + R2)}{R1}$$

It can readily be seen from this last equation, that variations in line voltage do not affect the time constant, and that the time constant is essentially P1 times C modified by a multiplier $(R1+R2)/R1$.

This system has particular advantage in long period timers because of the sharp discontinuity of charging current when $V_C = E_b$.

The charging current is monitored by Q2 during the timing cycle. While $i_C$ flows, Q2 is conductive which energizes the load 26. When the current $i_C$ abruptly ceases at $t_0$, Q2, Q3 and Q4 switch off, de-energizing load 26. Thus, the timer illustrated in FIGURE 1 is an interval timer.

Thus, FIGURE 2 illustrates the principle of the preferred embodiment of my invention in combining the constant current source 10 charging the capacitor C1 with the current detector 12 in series with the capacitor C1.

Now referring to FIGURE 3, which is a schematic electrical circuit diagram of a low cost timer circuit which may be employed to meet a wide variety of timer applications. Upon the application of battery potential of $+E_b$ volts across positive terminal 28 and ground terminal 30, the timing capacitor C1 starts to build up charge as a result of constant current supplied by the emitter follower stage which consists of transistor Q5 and the associated resistance network R1, P2, R2, and P1 and R4. The current supply for capacitor C1 is controlled by potentiometer P1, thus providing the means for adjustable time duration.

Potentiometer P2 serves as a calibration control for tolerance compensation in order to meet the setting accuracy requirements at all times. That is, during manufacture the potentiometer P1 is set for the maximum time duration and P2 adjusted until the specified duration is achieved. The voltage build-up across capacitor C1 is compared with a reference voltage derived from resistor R2. As soon as the voltage across capacitor C2 starts to exceed the reference voltage, transistor Q5 will draw base current. As a result, signal generation and amplification takes place which biases transistor Q6 on. The collector current of transistor Q7 is sufficient to trigger the SCR which in turn controls relay Ry1.

The charging of the capacitor C1 is detected by a zero detection network, as more fully described in the above-identified application of Klaus Wallentowitz, Serial No. 405,503. Generally, favorable timing conditions are obtained when the RC network constitutes a bridge and the voltage level detection takes place in the proximity of a zero volts potential crossover. These conditions are achieved by connecting two biased diodes CR1 and CR2 in the emitter leg of a transistor Q6. Thus, when the voltage of the potential across the capacitor C1 equals the voltage of the reference potential drop across R2, transistor Q6 turns on. This signal is amplified by amplifier transistor Q7 and is applied to the trigger 32 of the SCR.

The diode CR3 isolates transistor Q5 from transistor Q6. It protects transistor Q6 from excessive reverse bias on its base emitter junction and prevents leakage current in its collector base junction from charging capacitor C1. Resistor R7 limits the biasing current through diodes CR1 and CR2. Resistor R8 limits the current through transistor Q7. Capacitor C2 and resistor R9 serve an important noise suppression function in that any noise, particularly that induced by nearby electro-magnetic sources, is integrated by the action of capacitor C2 and resistor R9, minimizing any noise signals supplied to trigger 32 of the SCR. Diode CR4 serves the important function back biasing the SCR to prevent triggering thereof when transient currents are applied to the trigger 32 due to line transients, e.g., rapid fluctuations in the supply voltage $+E_b$. To this end a continuous current is passed through diode CR4 by means of a resistor R10 connected to the $+E_b$ supply. The resulting potential drop across the diode CR4 back biases the SCR and prevents triggering thereof by transients due to line voltage variations and the like being applied to the trigger 32. This back biasing of the SCR also raises the threshold of noise signals which will trigger the SCR.

Resistor R3 is a discharging resistor for capacitor C1 and this discharge function is effected by shorting contacts 34 and 36 upon energization of relay Ry1, as is conventional.

The mode of operation of the circuit of FIGURE 3, as disclosed and claimed herein, is illustrated in FIGURE 4. It will be noted that transistor Q5, as biased by the voltage divider R1 and R2, limits the current supplied to the capacitor C1 to a value determined by the setting of the variable resistor P1. Capacitor C1 is, therefore, charged at a constant current. The voltage $V_C$ thereacross rises linearly as shown by line 25 of FIGURE 7. When the voltage across the capacitor C1 equals a reference potential, that is when the potential at the first circuit terminal 38 equals the potential at second circuit terminal 40, the voltage detector produces a switching signal at its output 42. Thus, the potential difference between first circuit terminal 38 and second circuit terminal 40 may be expressed by the equation $$V = V_R - V_C$$

Detection is achieved when $V = 0$, that is, when $$V_R = V_C$$

As previously explained, the advantages of current detection can be achieved without supplying constant current charging to the capacitor C1, as shown in FIGURE 5; the capacitor C1 being charged conventionally through a variable resistor P1. The fall-off in charging current below a predetermined amount is detected by current detector 12 producing a switching signal on its output 18.

As also previously explained, the current detector in this circuit has the advantage of not being connected in parallel with the capacitor C1 and not providing any leakage paths thereacross, which are subject to temperature, humidity, and other ambient condition variations.

It will be understood by those skilled in the art that the circuits shown in FIGURES 1, 2, 4 and 5 are generalized showings of the applicability of my invention and that the circuit components shown therein may be chosen according to prior art techniques to have appropriate values for partiular timer applications.

The circuit of FIGURE 3, on the other hand, is designed for a wide variety of timer applications with the minimum variation in the parts requred. The battery voltage, $+E_b$ in this case, is preferably 20 volts D.C. However, it may vary over a wide range as the circuit is insensitive to line voltage variations as previously explained. The SCR is a type C106B supplied by General Electric; transistor Q5 is a type 2N3638, transistor Q6 is type 2N3393; and transistor Q7 is type 2N3638. Diodes CR1 through CR4 are all type DE50, supplied by Semiconductor Products. Variable resistor P1 takes the form of a potentiometer whose value varies with the time range. Similarly the values of capacitors C1 and resistor R4 also vary with range. Capacitor C2 is a .1 microfarad, ten volt, +100% −20% capacitor. Resistor R1 is 680 ohms; resistor R2, 2.7 kilohms; resistor R3, 27 ohms; resistor R5, 27 kilohms; resistor R6, 4.7 kilohms; resistor R7, 10 kilohms; resistor R8, 2.2 kilohms; resistor R9, 1 kilohm; resistor R10, 47 kilohms; each one-half watt, ±10% resistors; and potentiometer P2 is a 1.5 kilohms, 2 watt, ±10% potentiometer. For use as a delay timer when $+E_b$ is 20 volts D.C., relay Ry1 may be a 12 volt D.C., 10 amp, 130 ohm relay.

Examples of the values of P1, R4 and C1 are as follows: For a one second time range, P1 has a resistance of .25 megohms, R4 is 2.2 kilohms and C1 is 2 microfarads. For times with ranges up to 60 seconds, the value of P1 and R4 remains unchanged. C1 increases linearly up to 100 microfarads for a sixty seconds timing interval. For long time ranges, for example, 900 seconds, P1 is 1 megohm; resistor R4, 8.2 kilohms; and capacitor C1, 450 microfarads. Components are rated at half a watt, in all cases. P1 and R4 have a ±10% rating, and C1 has a +75% −10% rating.

It will thus be seen that the objects set forth above, among those made apparent from the preceding description, are efficiently attained and, since certain changes may be made in the above constructions without departing from the scope of the invention, it is intended that all matter contained in the above description or shown in the accompanying drawings shall be interpreted as illustrative and not in a limiting sense.

It is also to be understood that the following claims are intended to cover all of the generic and specific features of the invention, which, as a matter of language, might be said to fall therebetween.

Having described my invention, what I claim as new and desire to secure by Letters Patent is:

1. An electronic timer circuit comprising:
   (A) a source of reference potential;
   (B) a potentiometer having a variable potential terminal and connected across said source of reference potential;
   (C) a variable resistor;
   (D) a first electronic valve having first and second controlled terminals and a control terminal
      (a) said control terminal being connected to the variable potential terminal of said potentiometer; and,
   (E) a capacitor
      (a) said variable resistor, said controlled terminals and said capacitor being connected in series circuit across said source of reference potential, and
      (b) said capacitor providing a first circuit terminal independent of said source of reference potential, and
   (F) a resistor
      (a) in series circuit with said potentiometer across said source of reference potential, and
      (b) providing a second circuit terminal between said resistor and said potentiometer, and
   (G) a voltage detector connected between said first circuit terminal and said second circuit terminal.

2. An electronic timer circuit as defined in claim 1 wherein said voltage detector comprises:
   (a) a second electronic valve having first and second controlled terminals and a control terminal,
      (1) said control terminal connected to said first circuit terminal, and
      (2) said first controlled terminal being connected to said second circuit terminal to bias said electronic valve, and
   (b) a detector output circuit connected to said second controlled terminal of said second electronic valve.

3. An electronic timer circuit as defined in claim 2 wherein said second electronic valve is a transistor, and said voltage detector further comprises:
   (b) at least one semiconductor diode connected in series between said second circuit terminal and said first controlled terminal of said second electronic valve.

4. An electronic timer circuit as defined in claim 3 wherein said control terminal of said transistor is the base thereof, and:
   (c) a unidirectional conducting device connected between said first circuit terminal and said base.

5. An electronic timer as defined in claim 4 wherein said first controlled terminal of said transistor is the emitter thereof.

References Cited

UNITED STATES PATENTS

| | | | |
|---|---|---|---|
| 2,923,863 | 2/1960 | Chesson et al. | 307—293 XR |
| 2,998,532 | 8/1961 | Smeltzer | 307—293 XR |
| 3,032,714 | 5/1962 | Cohen | 307—293 XR |
| 3,048,708 | 8/1962 | Raver | 307—293 |
| 3,105,939 | 10/1963 | Onno et al. | 328—146 XR |
| 3,355,632 | 11/1967 | Wallentowitz | 307—293 XR |
| 3,376,431 | 4/1968 | Merrell | 307—293 XR |
| 3,392,352 | 7/1968 | White | 307—293 XR |

JOHN S. HEYMAN, Primary Examiner

S. D. MILLER, Assistant Examiner

U.S. Cl. X.R.

317—142; 328—131